Patented Oct. 24, 1950

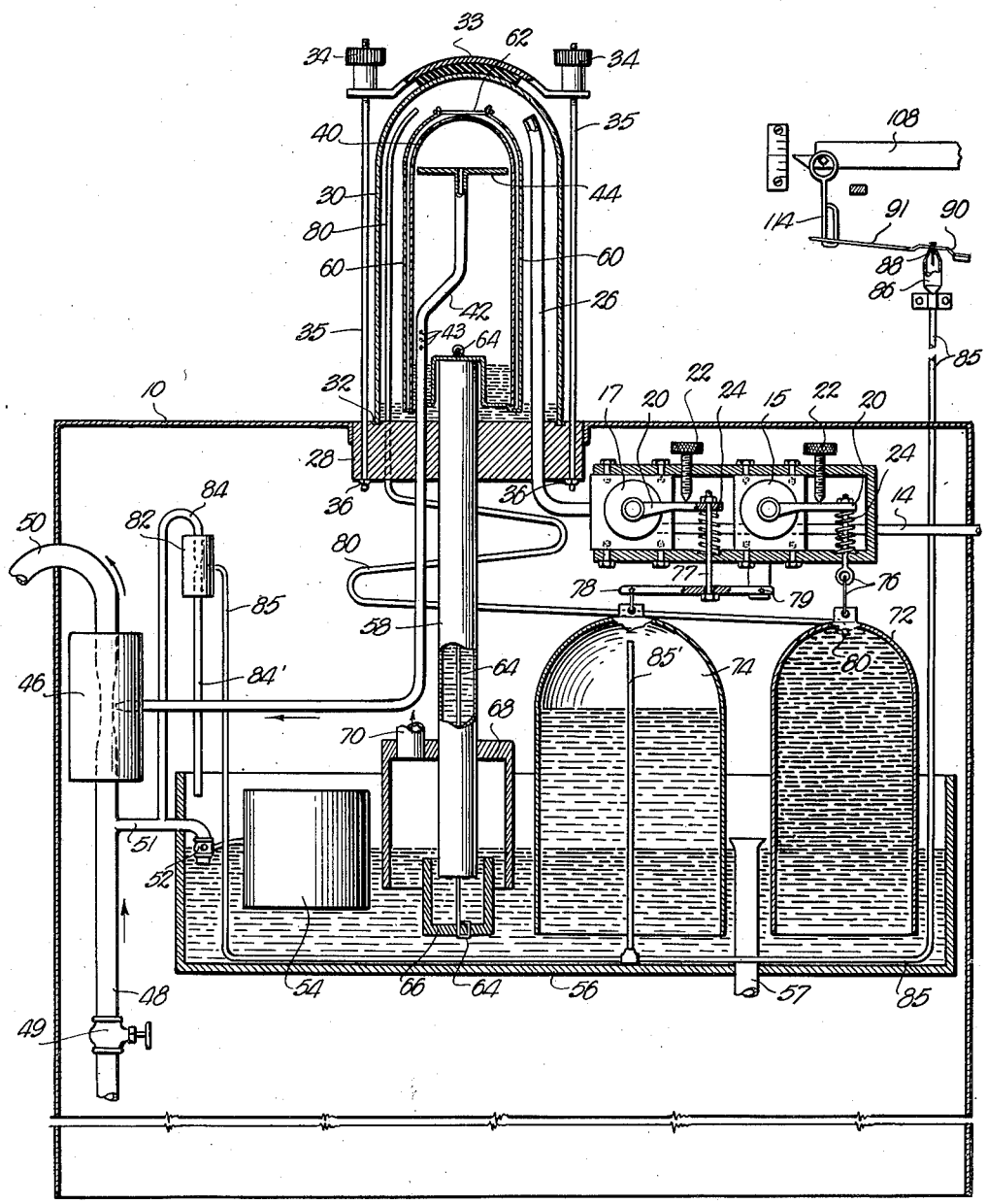

2,527,419

UNITED STATES PATENT OFFICE 2,527,419

PRESSURE CONTROLLED OPERATING MEANS

Elmer E. Harper, Monrovia, Calif.; Esther Pardee Harper executrix of Elmer E. Harper, deceased Original application January 18, 1945, Serial No. 573,415. Divided and this application January 18, 1945, Serial No. 573,416

2 Claims. (Cl. 137—144)

The present invention relates to improvements in control mechanism or apparatus adapted for the regulation or control of the operation of other mechanism or operating means, such as regulating means for the control of valves and the like.

A primary object of the invention is to provide an accurate and highly sensitive type of control means in which the control function or action is made responsive to fluctuations in pressure taking place at the particular point of regulation or control, or at some other selected point, with a view to maintaining both a substantially uniform as well as most accurate regulation of the device or mechanism to which the control operation is being applied.

As one practical form of construction for accomplishing this result, I employ pressure-actuated float members as elements of the control mechanism, with a view to obtaining a type of operating action which is not only of a highly sensitive character but which also has the advantage of being fairly positive in its transmission of the corresponding control function to the parts subject to such control action.

In devising types of construction for carrying the invention into actual practice, one preferred embodiment of the same comprises a duplex form of control mechanism wherein one control function is carried out in a manner supplementing another control function or operation; and as an incident to this character of control operation, one of said control functions is made responsive to an independent automatic control mechanism through the medium of fluid pressure regulating means and connections for transmitting the necessary control impulses for such purpose.

The invention further contemplates a form of construction in which the operation may be carried out with either a single or duplex mode of control operation.

With the foregoing general objects in view, as well as various other and minor objects or purposes which will appear in the course of the detailed specification, the invention will now be described by reference to the accompanying drawing illustrating one type of apparatus designed for practical operation in accordance with the principles of the aforesaid improvements, after which those features and combinations thereof deemed to be novel and patentable will be particularly set forth and claimed.

In the drawing, the view shown represents a schematic elevation illustrating a form of control apparatus of a type suitable for exemplifying the construction and operations or functions entering into and comprising the present invention.

Referring now to the drawing in detail, the improvements forming the subject of the present invention are illustrated as embodied in a control mechanism as designed for the control and regulation of feeding means of a type suitable for controlling the flow of liquid or gaseous materials. In a certain copending application Ser. No. 573,415, filed January 18, 1945, which matured into Patent No. 2,469,230 on May 3, 1949, and of which this application is a division, I have illustrated feeding apparatus of this character particularly designed for maintaining a uniform gravimetric flow of liquid or gaseous materials, and the apparatus shown in the accompanying drawing is of the same character so far as pertains to the generic features of the control principle, but without limitation of the same to the particular gravimetric design of construction specifically outlined in said application.

Accordingly the apparatus as herein shown comprises a suitable pipe or tubing 14 whereby the liquid or gaseous material, whose flow is to be controlled or regulated, is conducted to a duplex valve assembly made up of two valves 15 and 17 arranged in series, and each valve having a control or regulating arm 20 and also an adjustable stop screw 22, as well as compression spring 24 tending normally to close the valve to an extent limited by the adjustment of the corresponding stop screw 22.

From the valve 17 the outlet is by way of a flow pipe 26 extending upwardly through a block or plate 28 shown mounted at the top of a cabinet 10, and serving as the supporting base of a glass bell jar 30, the lower edge of which is seated in a fluid-tight relation within a groove or channel 32 in said base, and firmly secured in this relation by means of a tie bar 33 clamped against the top of the jar where the ends of said bar are engaged by nuts 34 at the upper ends of anchoring rods 35 which have their lower ends retained by nuts 36 engaging the under face of said supporting base 28.

The flow pipe 26 terminates at the upper interior of the bell jar member 30, which also encloses a transparent bell float member 40, which in turn encloses the upper open end of a vacuum pipe connection 42 carrying a disk element 44 designed for guiding engagement with the interior of said bell member 40.

The vacuum pipe 42 connects with a water jet form of eductor device 46 having a water supply connection 48 and valve 49, and also a discharge outlet pipe 50 for the discharge of the outgoing gas and water mixture.

One object in the use of such an eductor device in connection with the discharge, is to maintain a partial vacuum or negative pressure condition in the carrying out of the control operation, as a safeguard against any leak in the system, which would result only in drawing in air to be mixed with the chlorine gas; that is to say, any leak in the system would be inward rather than outward. While this might involve a possible reduction in the feeding rate of the gas, pending repair of the leak, it would be preferable to an objectionable escape of the chlorine which might result from a reliance on a feeding pressure as maintained at the source of said gas supply.

The water supply pipe 48 is provided with a branch connection 51 controlled by a valve 52 and a float element 54 for supplying water to a constant level float box 56 having an overflow outlet 57, and into which float box or chamber 56 a combination water supply and overflow connection 58 extends from the bell jar chamber 30 and from within the lower portion of the float member 40. The bell float member 40 is provided with a wire harness structure 60, the ends of which are secured by a suitable link 62 at the top of said member and adapted to freely support the same upon the upper end of said water supply and overflow pipe 58. To this harness structure 60 is attached a lifting wire 64, the lower end of which is attached to a vacuum breaker cup 66 which encloses the lower end of the pipe 58, and the latter also carries a vent bell 68 which in turn encloses the cup 66 and is provided with a safety vent outlet 70.

The valves 15 and 17 are controlled by means of bell float members 72 and 74 respectively, which are located in partly submerged relation in said float box or chamber 56. For this purpose the arm 20 of the valve 15 is provided with a link 76 connecting it with the float member 72, and the regulating arm of the valve 17 is also provided with a link 77 connecting it with an operating lever 78 fulcrumed at 79 and attached to the top of the other float member 74. The upper portion of the float member 72 is also provided with a flexible vacuum or fluid-pressure transmitting tube 80 which leads to the upper interior portion of the bell jar chamber 30, as shown.

While the float bell member 72 and its connections provide a valve control means responsive to changes in the vacuum or fluid pressure action produced in the bell jar chamber 30, the other float bell member forms part of an independent control mechanism operating in response to differential pressure changes, and one form of such mechanism suitable for the purpose will now be described.

A secondary water jet or eductor device 82 is provided, having a pipe connection 84 with the water supply and also an overflow pipe connection 84' with the float box 56, and also a vacuum tube connection 85 leading to a control valve device 86 provided with a thin-edged valve seat defining an air inlet orifice 88 which is controlled by a rocker type of valve member 90 including an operating arm 91, a construction which is in all essential respects similar to that illustrated in my copending application Serial No. 539,049, filed June 7, 1944, and which matured into Patent No. 2,459,700 on January 18, 1949. As shown in the drawing, the tube 85 is provided with a branch 85' leading from the interior of the float bell 74, where it has an inlet orifice near the upper interior of said float member.

The arm 91 of the valve member 90 is shown as engaged by a loop element or link 114 suspended from a control arm 108 which may form part of a control system of the gravimetric type as illustrated in my aforesaid copending application, the control movements of which arm would thus be imparted to said valve 90 for correspondingly regulating the effective action of the educator operation as produced by the device 82, as explained in said application. Obviously the form and arrangement of control connections shown for varying said eductor operation is simply one form or example of means which may be employed by the present invention for carrying out the fluid or differential pressure control action, and such means may assume different forms of construction for accomplishing essentially the same result.

In the operation of apparatus constructed and arranged as above described (which is fully explained in the aforesaid application), the eductor device 46 produces a partial vacuum in the bell jar chamber 30, whereby a continuous flow of water is maintained, upward through the water connection 58 into said bell jar, the difference between the water levels in said jar and the float box 56 representing approximately the degree of vacuum which is maintained, and this being fairly constant during the normal feeding action when once established. Since the influence of this vacuum is transmitted through the tubular connection 80 to the float bell 72, this will result in filling both said float member and the connection 80 up to the same level as the bell jar, and consequently produce a sufficient pull on the arm 20 of the valve 15 to open said valve, thus opening the gas flow up to the valve 17.

While the opening of the valve 49 starts the operation of both the eductor devices 46 and 82, the normal setting or adjustment of the valve 90 is such as to admit sufficient air through the pipe connection 85 to prevent the development of a working vacuum in the bell float member 74 strong enough to operate the valve 17 so long as the control member 108 is in a neutral condition, or requires no operation or regulation of the valve 17. However, any movement of said control member 108, in response to control conditions, is transmitted through the connection 114 to the valve 90; as, for example, a lowering of the valve arm 91 will result in a movement of the valve 90 into a more nearly closed condition. This will produce an air-choking effect on the pipe connections 85 and 85' leading to the eductor 82 and the float member 74, and consequently this permits the eductor action to build up a stronger vacuum action within said float member 74, with corresponding lowering movement of said member and hence a downward pulling action on the connection with the arm 20 of the valve 17, which is thereby operated into wider open position for allowing an increased flow of gas through the pipe 26 to the bell jar 30.

Thereafter, as the process continues, the operation of the valve 17 will be automatically regulated, for controlling the gas flow, in exact accordance with the movements of the control member 108, representing the proper corrective impulses which are transmitted to the float bell 74, and the corresponding regulative action is imparted to the valve 17, as required for maintaining the desired rate of flow.

The gas entering the bell jar chamber 30 fills the space therein outside the float member 40, with the result that a differential pressure is developed which forces the gas to escape by the only possible outlet, or by way of the said float member, which it enters by a bubbling action as it emerges inward past the lower margin of said member. This bubbling effect is plainly visible for distances upwards of fifty feet. From the interior of the float member 40 the gas is withdrawn of course by the eductor action by way of the ports 43 in the pipe 42 and, along with some flow of water from the bell jar chamber 30 as well as from the water supply 48, is discharged by said eductor action out through the pipe 50.

It will therefore be understood that, after the feeding operation has once been started, as above described, a uniform flow rate will be immediately thereafter established by the automatic operation of the control member 108 and valve device 86 and the float-actuated connections therefrom to the valve 17. This flow is readily observed by virtue of the bubbling action taking place in the float member 40, whereby the minutest flow movements are indicated; and by suitable illumination this bubbling effect may be rendered distinctly visible for distances up to a hundred feet.

With reference to the provision of the duplex form of valve and valve-control mechanism for the flow pipe line 14, it may be pointed out that a very important safety function is served by this combination of valves. Where a valve, such as the valve 17, is subject to more or less continuous operation, the wear on the valve may eventually prevent its functioning to the extent of completely shutting off the flow; whereas an auxiliary valve, such as the valve 15, which is normally in wide-open position, is subject to comparatively little wear, and hence can normally be depended upon to function satisfactorily as a positive shut-off valve, even after long use. Moreover, it is particularly important in gravimetric operation to make proper provision for an effective and complete shut off of the gas flow, especially in chlorine operations, and to do this automatically, as in the event of interruption of the water supply, or of failure of vacuum, etc.

Provision is also made for safeguarding against abnormal pressure conditions; for example, in case sufficient vacuum should be developed in the pipe 26 for raising the water level to an undue height in the bell jar chamber 30, the float member 40 will be lifted, thereby acting, through the wire connection 64, to lift the cup 66 somewhat above the water level in the float box 56, thus resulting in the effective height or column of liquid in the pipe 58 being decreased as the rim of said cup 66 rises above the surrounding liquid level, and thereby breaking the vacuum. Likewise, any excess of positive pressure in the bell jar chamber, due to valve leakage, would be at once vented out through the pipe 58 to the vent bell 68 and its outlet 70. Of course the possibility of any excess water pressure in said bell jar chamber is eliminated by virtue of the large overflow outlet provided by said pipe 58.

From the foregoing it will therefore be apparent that the primary purposes of the invention are accomplished as regards the novel construction and arrangement of means for effecting the desired automatic control functions, and that the control action which is developed by the improved construction is of a most sensitive character, due to the operation being in response to the most minute changes in differential pressure as transmitted to the float bell members 72 and 74; and the operation of these float bell members is in turn instantaneous, as well as substantially positive in action, thereby insuring a high degree of smoothness and uniformity as well as accuracy in the carrying out of the required control operation and regulation of the valves or other devices subject to said control mechanism. At the same time it will be obvious that the apparatus herein illustrated may be very materially modified in various respects to conform to varying requirements of local conditions. For example, while the drawing illustrates a control application in which a duplex form of control is carried out, with one control feature supplementing the other, a single type of control function may be preferred under some conditions, with the option of adopting the form of control carried out by either the float member 72 or the other float member 74.

Again, any desired type of control mechanism having a suitable automatically operating control member equivalent in function to the member 108 herein illustrated may readily be assembled in appropriate operative relation to the control features of the present construction, for carrying out a corresponding control or regulating operation in response to the particular type of control means adopted.

I therefore desire to be understood as expressly reserving the right to make all such changes or modifications as may fairly and properly be deemed to fall within the spirit and scope of my invention as set forth and defined by the following claims.

Having thus described my invention, what I claim and desire to secure by Letters Patent is:

1. Pressure-controlled operating means comprising, in combination with means providing a flow passage, separate valves arranged in series for controlling the flow through said passage and having separate operating members, separate pressure-actuated means for regulating said operating members, separate vacuum producing means having separate fluid pressure control connections with said pressure-actuated means, and automatic means responsive to fluid pressure within one of the control connections and including means for modifying the fluid pressure transmitted through said one of the control connections.

2. Control mechanism comprising, in combination with means providing a flow passage, separate valves arranged in series for controlling the flow through said passage, separate pressure-actuated means for regulating said valves, vacuum producing means communicating with said flow passage and have a fluid pressure control connection with one of said pressure-actuated means, separate vacuum producing means provided with a fluid pressure control connection with the other of said pressure-actuated means, and automatic means responsive to fluid pressure within the first mentioned control connection and including means for modifying the fluid pressure transmitted through said first mentioned control connection.

ELMER E. HARPER.

REFERENCES CITED

The following references are of record in the file of this patent:

UNITED STATES PATENTS

| Number | Name | Date |
|---|---|---|
| 1,593,543 | Simpson | July 20, 1926 |
| 2,196,999 | Loughridge | Apr. 16, 1940 |
| 2,205,678 | Adams | June 25, 1940 |
| 2,249,719 | Brown | July 15, 1941 |
| 2,274,266 | Fairchild | Feb. 24, 1942 |
| 2,309,228 | Waterman | Jan. 26, 1943 |
| 2,332,627 | Erbguth | Oct. 26, 1943 |
| 2,370,110 | Spence | Feb. 20, 1945 |